(12) United States Patent
Murakami

(10) Patent No.: US 10,880,442 B2
(45) Date of Patent: Dec. 29, 2020

(54) ELECTRONIC DEVICE AND A NON-TRANSITORY COMPUTER-READABLE RECORDING MEDIUM

(71) Applicant: KYOCERA Document Solutions Inc., Osaka (JP)

(72) Inventor: Takashi Murakami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/534,562

(22) Filed: Aug. 7, 2019

(65) Prior Publication Data

US 2020/0076961 A1  Mar. 5, 2020

(30) Foreign Application Priority Data

Aug. 31, 2018 (JP) ................. 2018-162549

(51) Int. Cl.
*G06F 3/12* (2006.01)
*H04N 1/00* (2006.01)
*H04N 1/32* (2006.01)

(52) U.S. Cl.
CPC ....... *H04N 1/00087* (2013.01); *G06F 3/1236* (2013.01); *H04N 1/00061* (2013.01); *H04N 1/00076* (2013.01); *H04N 1/00079* (2013.01); *H04N 1/32657* (2013.01); *H04N 1/32667* (2013.01)

(58) Field of Classification Search
CPC ............. H04N 1/0001; H04N 1/00037; H04N 1/00061; H04N 1/00076; H04N 1/00087; H04N 1/00344; H04N 1/00973; H04N 1/32747; H04N 2201/0017; H04N 2201/0039; H04N 2201/32657; H04N 2201/32667; G06F 3/1234; G06F 3/1236
USPC ................................ 358/1.11–1.18; 271/225
See application file for complete search history.

(56) References Cited

U.S. PATENT DOCUMENTS

2015/0049363 A1\* 2/2015 Nishiyama ......... H04N 1/00917
358/1.15
2017/0366701 A1\* 12/2017 Ooba ................. H04N 1/00076
2018/0332182 A1\* 11/2018 Fukasawa .......... H04N 1/00344

FOREIGN PATENT DOCUMENTS

JP  2017-227989  12/2017

\* cited by examiner

*Primary Examiner* — Chad Dickerson
(74) *Attorney, Agent, or Firm* — Stein IP, LLC

(57) ABSTRACT

An image forming apparatus manages restart setting information that defines settings related to restarting of remote connection with a computer, controls remote connection, and changes the restart setting information according to an instruction. When remote connection is terminated as a result of a function that terminates remote connection being executed, if the restart setting information includes a setting for automatically restarting remote connection, remote connection is automatically restarted and, if the restart setting information includes a setting for not automatically restarting remote connection, remote connection is not automatically restarted.

4 Claims, 7 Drawing Sheets

FIG.3

27c RESTART SETTING INFORMATION

| | | |
|---|---|---|
| 1ST RESTART SETTING INFORMATION (27d) | AUTOMATIC DECISION YES/NO SETTING | YES |
| | RESTART YES/NO SETTING | NO |
| 2ND RESTART SETTING INFORMATION (27e) | AUTOMATIC DECISION YES/NO SETTING | YES |
| | RESTART YES/NO SETTING | NO |

…

ELECTRONIC DEVICE AND A NON-TRANSITORY COMPUTER-READABLE RECORDING MEDIUM

INCORPORATION BY REFERENCE

This application is based upon and claims the benefit of priority from the corresponding Japanese Patent Application No. 2018-162549 filed on Aug. 31, 2018, the entire contents of which are incorporated herein by reference.

BACKGROUND

The present disclosure relates to an electronic device that is remotely connected to an external device, and relates also to a non-transitory computer-readable recording medium that stores a remote connection control program.

There are conventionally known, as a kind of electronic device, image forming apparatuses that are provided with a printing control device and that are remotely connected to a terminal device. Such an image forming apparatus, when instructed to reboot the printing control device from the remotely connected terminal device, automatically restarts, after completion of rebooting of the printing control device, remote connection with the terminal device that has been terminated as a result of the rebooting.

Inconveniently, in those conventional image forming apparatuses, when rebooting of the printing control device in response to an instruction from the terminal device is complete, remote connection with the terminal device is always restarted automatically. This is inconvenient to a user who does not wish remote connection with the terminal device to be restarted automatically.

SUMMARY

According to one aspect of the present disclosure, an electronic device includes: an information manager which manages restart setting information that defines settings related to restarting of remote connection with an external device; a connection controller which controls remote connection; and a function executor which executes a function while remote connection is maintained. The information manager changes the restart setting information according to an instruction. When remote connection is terminated as a result of a function that terminates remote connection being executed by the function executor, the connection controller, if the restart setting information includes a setting for automatically restarting remote connection, automatically restarts the remote connection and, if the restart setting information includes a setting for not automatically restarting the remote connection, does not automatically restart the remote connection.

Further features and advantages of the present disclosure will become apparent from the description of embodiments given below.

BRIEF DESCRIPTION OF THE DRAWINGS

FIG. 3 is a diagram showing one example of the restart setting information shown in FIG. 2;

DETAILED DESCRIPTION

Figure 1:
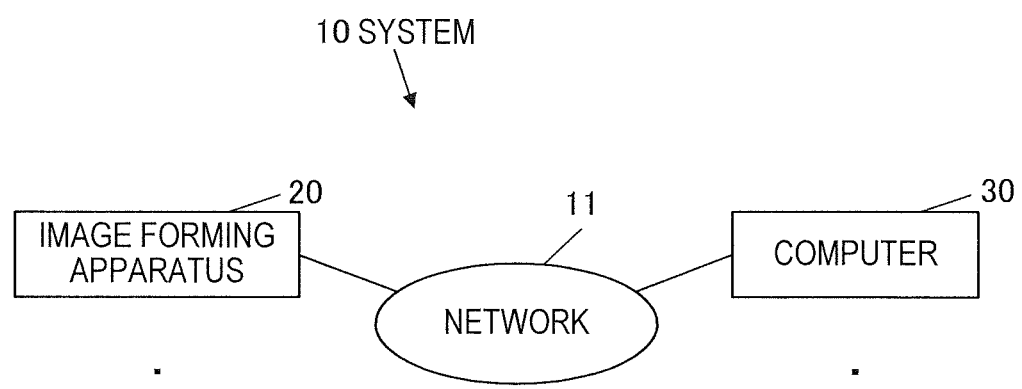
FIG. 1 is a block diagram of a system according to an embodiment.

Hereinafter, an embodiment of the present disclosure will be described with reference to the accompanying drawings. FIG. 1 is a block diagram of a system 10 according to the embodiment. As shown in FIG. 1, the system 10 includes an image forming apparatus 20 as an electronic device, a computer 30 as an external device, and a network 11.

The image forming apparatus 20 is, for example, an MFP (multifunction peripheral), a specialized printer, a specialized copier, a specialized facsimile machine, or a specialized scanner. The system 10 can include a plurality of similar image forming apparatuses 20. The image forming apparatus 20 is used by a user on a customer's side (hereinafter referred to as the "customer-side user").

The computer 30 is, for example, a PC (personal computer). The system 10 can include a plurality of similar computers 30. The computer 30 is used by a user on a provider's side, that is, at the provider of the image forming apparatus 20, such as a call center or a help desk (hereinafter referred to as the "provider-side user").

The image forming apparatus 20 and the computer 30 can be connected together remotely across the network 11 such as the Internet. In the system 10, the image forming apparatus 20 and the computer 30, when connected together remotely, cooperate with each other to provide functions such as remote guidance and remote maintenance.

Remote guidance is a function that assists the provider-side user in explaining the operation of the image forming apparatus 20 to the customer-side user by telephone. Specifically, the screen on the display portion of the image forming apparatus 20 is displayed on the display portion of the computer 30. Using the remote guidance function, the provider-side user can see the screen on the display portion of the image forming apparatus 20.

Thus, when explaining the operation of the image forming apparatus 20 to the customer-side user by telephone, the provider-side user can, by using the remote guidance function, easily grasp the operation on the image forming apparatus by the customer-side user. Likewise, when having the provider-side user explain the operation of the image forming apparatus by telephone, also the customer-side user can, by using the remote guidance function, easily understand the instructions from the provider-side user.

Remote maintenance is a function that allows adjustment on and maintenance of the image forming apparatus through operation of the image forming apparatus 20 via the operation portion of the computer 30. The provider-side user can, by using the remote maintenance function, eliminate the need to visit the installation site of the image forming apparatus 20 in the system 10. This helps reduce costs for maintenance of the image forming apparatus 20.

Figure 2:
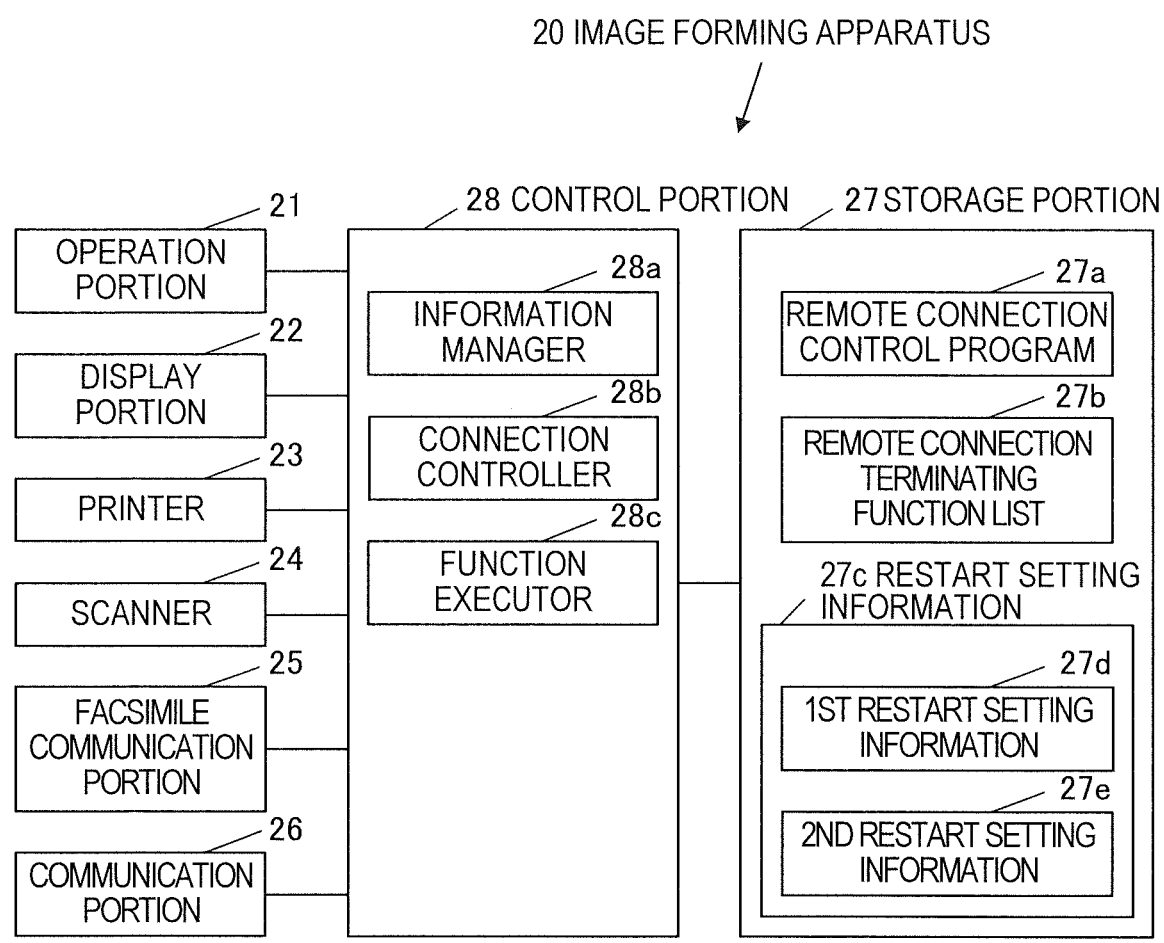
FIG. 2 is a block diagram of the image forming apparatus shown in FIG. 1 when it is an MFP.

FIG. 2 is a block diagram of the image forming apparatus 20 in a case where it is an MFP. The image forming apparatus 20 shown in FIG. 2 includes an operation portion 21, a display portion 22, a printer 23, a scanner 24, a facsimile communication portion 25, a communication portion 26, a storage portion 27, and a control portion 28.

The operation portion 21 is an operation device, such as buttons, that accepts various operations. The display portion 22 is a display device, such as an LCD (liquid crystal display), that displays various kinds of information. The printer 23 is a printing device that prints an image on a recording medium such as a sheet of paper. The scanner 24 is a reading device that reads an image from a document.

The facsimile communication portion 25 is a facsimile device that performs facsimile communication with an external facsimile machine (not shown) across a communication line such as a public telephone line. The communication portion 26 is a communication device that performs communication with an external device across a network, such as a LAN (local area network) or the Internet, or directly, that is, without going across a network, on a wired or wireless basis.

The control portion 28 controls the entire image forming apparatus 20. The control portion 28 includes, for example, a CPU (central processing unit), a ROM (read-only memory), and a RAM (random-access memory). The ROM stores programs and various kinds of data. The RAM is used as a working area for the CPU. The CPU executes programs stored in the storage portion 27 or in the ROM in the control portion 28. Thus, the control portion 28 and the storage portion 27 constitute a computer within the image forming apparatus 20, and executes programs such as a remote connection control program 27a (described later).

The control portion 28 implements an information manager 28a, a connection controller 28b, and a function executor 28c. The information manager 28a executes the remote connection control program 27a (described later) in the storage portion 27, and thereby manages restart setting information 27c. The connection controller 28b controls remote connection with the computer 30. The function executor 28c executes a predetermined function while remote connection with the computer 30 is maintained.

The storage portion 27 is a non-volatile storage device, such as a semiconductor memory or a HDD (hard disk drive), that stores various kinds of information. The storage portion 27 stores the remote connection control program 27a, a remote connection terminating function list 27b, and a restart setting information 27c.

The remote connection control program 27a is a program for controlling remote connection with the computer 30. The remote connection control program 27a is, for example, installed on the image forming apparatus 20 at the stage of its manufacture. The remote connection control program 27a may be installed on the image forming apparatus 20 on an additional basis from an external storage medium such as a USB (universal serial bus) memory or an SD card. That is, the remote connection control program 27a may be installed from a non-transitory computer-readable recording medium. Instead, the remote connection control program 27a may be installed on the image forming apparatus 20 on an additional basis across a network.

The remote connection terminating function list 27b contains the data of a list of functions that terminate remote connection. Functions that terminate remote connection include, for example, the function of rebooting the image forming apparatus 20, the function of rebooting the network function of the image forming apparatus 20, the function of changing the IP (Internet protocol) address of the image forming apparatus 20, and the function of changing the network settings of the image forming apparatus 20.

The restart setting information 27c contains data on settings related to restarting of remote connection with the computer 30. FIG. 3 is a diagram showing one example of the restart setting information 27c. The restart setting information 27c shown in FIG. 3 includes first restart setting information 27d and second restart setting information 27e. The first restart setting information 27d is provided for a case where an instruction to execute a function that terminates remote connection is entered via remote connection. The second restart setting information 27e is provided for a case where an instruction to execute a function that terminates remote connection is entered not via remote connection.

The first and second restart setting information 27d and 27e each include an automatic decision yes/no setting and a restart yes/no setting. The automatic decision yes/no setting defines whether or not to automatically decide to restart remote connection. The restart yes/no setting defines, when whether or not to restart remote connection is decided automatically, whether to decide to restart or not to restart remote connection.

The first and second restart setting information 27d and 27e in the restart setting information 27c are by default set such that the automatic decision yes/no setting is "yes" and that the restart yes/no setting is "no". That is, by default, the automatic decision yes/no setting is set for "automatically deciding whether or not to restart remote connection" and the restart yes/no setting is set for "not restarting remote connection".

"No" in the automatic decision yes/no setting is a setting for "not automatically deciding whether or not to restart remote connection". "Yes" in the restart yes/no setting is a setting for "restarting remote connection".

When a function that terminates remote connection is executed according to an instruction entered via remote connection, the automatic decision yes/no setting and the restart yes/no setting in the first restart setting information 27d are referred to. If, in the first restart setting information 27d, the automatic decision yes/no setting is set for "automatically deciding whether or not to restart remote connection" and the restart yes/no setting is set for "restarting remote connection", then remote connection, which has been terminated, is restarted automatically.

If, in the first restart setting information 27d, the automatic decision yes/no setting is for "automatically deciding whether or not to restart remote connection" and the restart yes/no setting is set for "not restarting remote connection", then remote connection, which has been terminated, is not restarted. If, in the first restart setting information 27d, the automatic decision yes/no setting is for "not automatically deciding whether or not to restart remote connection", then the user is asked whether or not to restart remote connection, which has been terminated".

When a function that terminates remote connection is executed according to an instruction entered not via remote connection, the automatic decision yes/no setting and the restart yes/no setting in the second restart setting information 27e are referred to. If, in the second restart setting information 27e, the automatic decision yes/no setting is set for "automatically deciding whether or not to restart remote connection" and the restart yes/no setting is set for "restarting remote connection", then remote connection, which has been terminated, is restarted automatically.

If, in the second restart setting information 27e, the automatic decision yes/no setting is for "automatically deciding whether or not to restart remote connection" and the restart yes/no setting is set for "not restarting remote connection", then remote connection, which has been terminated, is not restarted. If, in the second restart setting information 27e, the automatic decision yes/no setting is for "not automatically deciding whether or not to restart remote connection", then the user is asked whether or not to restart remote connection, which has been terminated".

Figure 4:
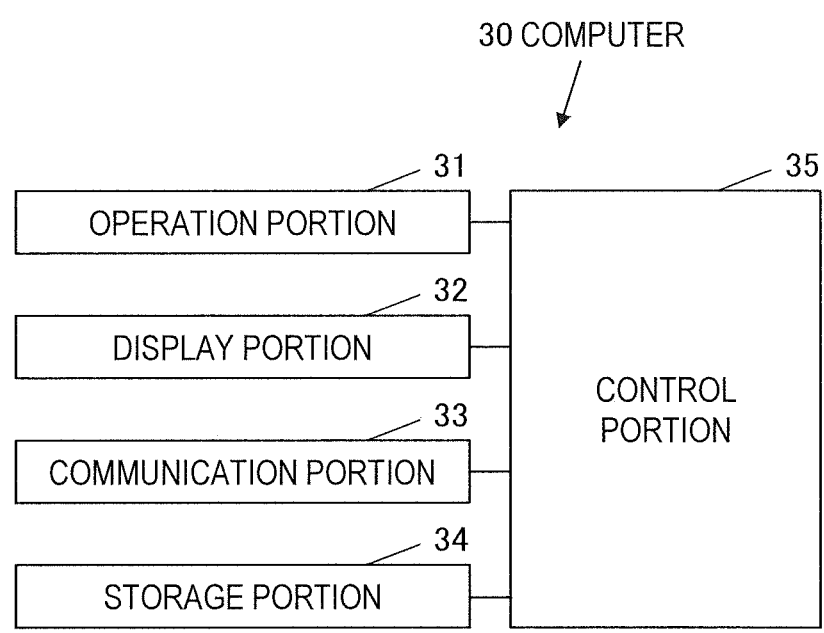
FIG. 4 is a block diagram of the computer shown in FIG. 1.

FIG. 4 is a block diagram of the computer 30. As shown in FIG. 4, the computer 30 includes an operation portion 31, a display portion 32, a communication portion 33, a storage portion 34, and a control portion 35.

The operation portion 31 is an operation device, such as a keyboard and a mouse, that accepts various operations. The display portion 32 is a display device, such as an LCD, that displays various kinds of information. The communication portion 33 is a communication device that performs communication with an external device across a network, such as a LAN (local area network) or the Internet, or directly, that is, without going across a network, on a wired or wireless basis. The storage portion 34 is a non-volatile storage device, such as a semiconductor memory or a HDD, that stores various kinds of information.

The control portion 35 controls the entire computer 30. The control portion 35 includes, for example, a CPU, a ROM, and a RAM. The ROM stores programs and various kinds of data. The RAM is used as a working area for the CPU in the control portion 35. The CPU executes programs stored in the storage portion 34 or in the ROM in the control portion 35.

Next, the operation of the system 10 will be described. First, a description will be given of the operation of the image forming apparatus 20 when it changes the remote connection terminating function list 27b. When an instruction to change the remote connection terminating function list 27b is entered via the operation portion 21 or via the communication portion 26, the information manager 28a in the image forming apparatus 20 changes the remote connection terminating function list 27b according to the entered instruction.

Next, a description will be given of the operation of the image forming apparatus 20 when it changes the restart setting information 27c. When an instruction to change the restart setting information 27c is entered via the operation portion 21, the information manager 28a in the image forming apparatus 20 changes the restart setting information 27c according to the entered instruction. Here, the information manager 28a changes the restart setting information 27c according to an instruction entered not via remote connection, but does not change the restart setting information 27c according to an instruction entered via remote connection.

Next, a description will be given of the operation of the image forming apparatus 20 when it starts remote connection with the computer 30 according to an instruction entered via the operation portion 21. When an instruction to start remote connection with the computer 30 is entered via the operation portion 21, the connection controller 28b in the image forming apparatus 20 starts remote connection with the computer 30.

Figure 5:
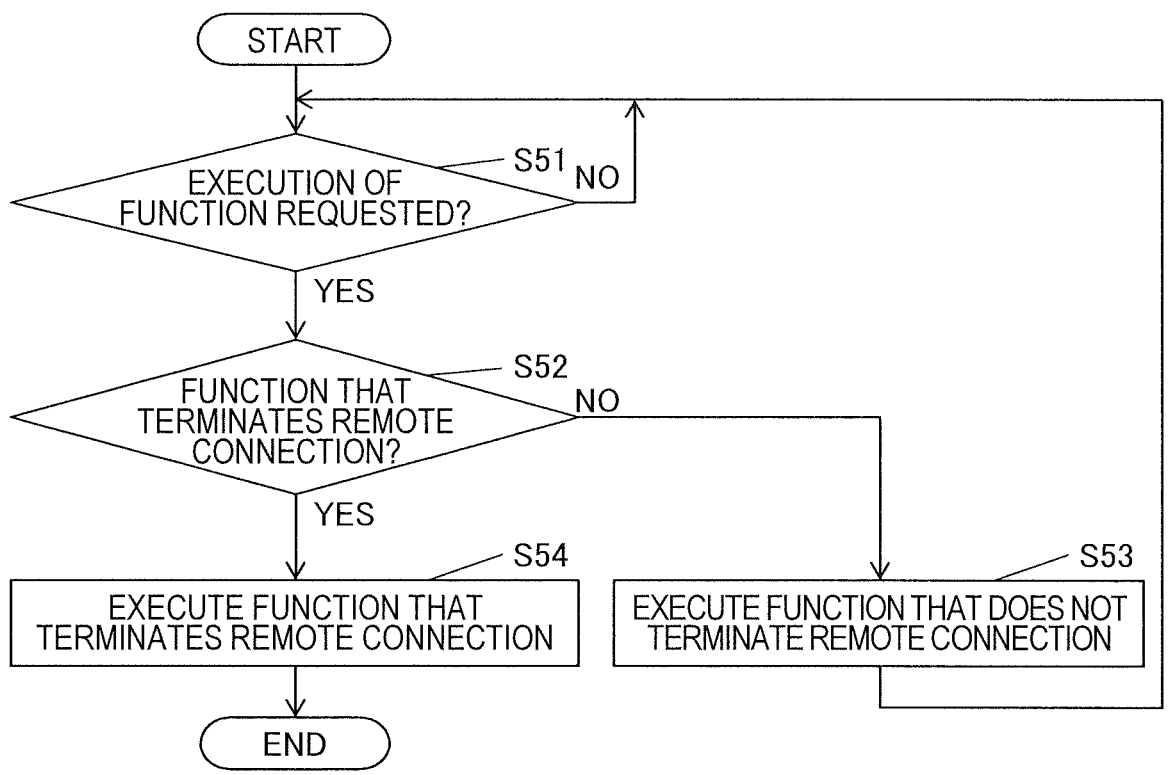
FIG. 5 is a flow chart of the operation of the image forming apparatus shown in FIG. 2 while remote connection with a computer is maintained.

Next, a description will be given of the operation of the image forming apparatus 20 while remote connection with the computer 30 is maintained. FIG. 5 is a flow chart of the operation of the image forming apparatus 20 while remote connection with the computer 30 is maintained.

As shown in FIG. 5, the function executor 28c in the image forming apparatus 20 stands by until, at Step S51, it recognizes that execution of a function is requested. The function recognized at Step S51 is, for example, the function of rebooting the image forming apparatus 20, the function of rebooting the network function of the image forming apparatus 20, the function of changing the IP address of the image forming apparatus 20, the function of changing the network settings of the image forming apparatus 20, or the function of adjusting the image forming apparatus 20 (such as cleaning a drum in the scanner 24).

If, at Step S51, execution of a function is recognized to be requested, an advance is made to Step S52. At Step S52, the function executor 28c checks whether or not the function of which execution is requested is a function that terminates remote connection. Here, if the function of which execution is recognized to be requested at Step S51 is included in the remote connection terminating function list 27b, the function executor 28c recognizes it to be a function that terminates remote connection. By contrast, if the function of which execution is recognized to be requested at Step S51 is not included in the remote connection terminating function list 27b, the function executor 28c recognizes it not to be a function that terminates remote connection.

If, at Step S52, the function of which execution is recognized to be requested at Step S51 is recognized not to be a function that terminates remote connection, an advance is made to Step S53. At Step S53, the function executor 28c executes the function of which execution is recognized to be requested at Step S51, that is, a function that does not terminate remote connection, and then a return is made to Step S51.

If, at Step S52, the function of which execution is recognized to be requested at Step S51 is recognized to be a function that terminates remote connection, an advance is made to Step S54. At Step S54, the function executor 28c executes the function of which execution is recognized to be requested at Step S51, that is, a function that terminates remote connection, and the operation shown in FIG. 5 ends.

When the function executor 28c executes the function that terminates remote connection, remote connection between the image forming apparatus 20 and the computer 30 is terminated.

Figure 6:
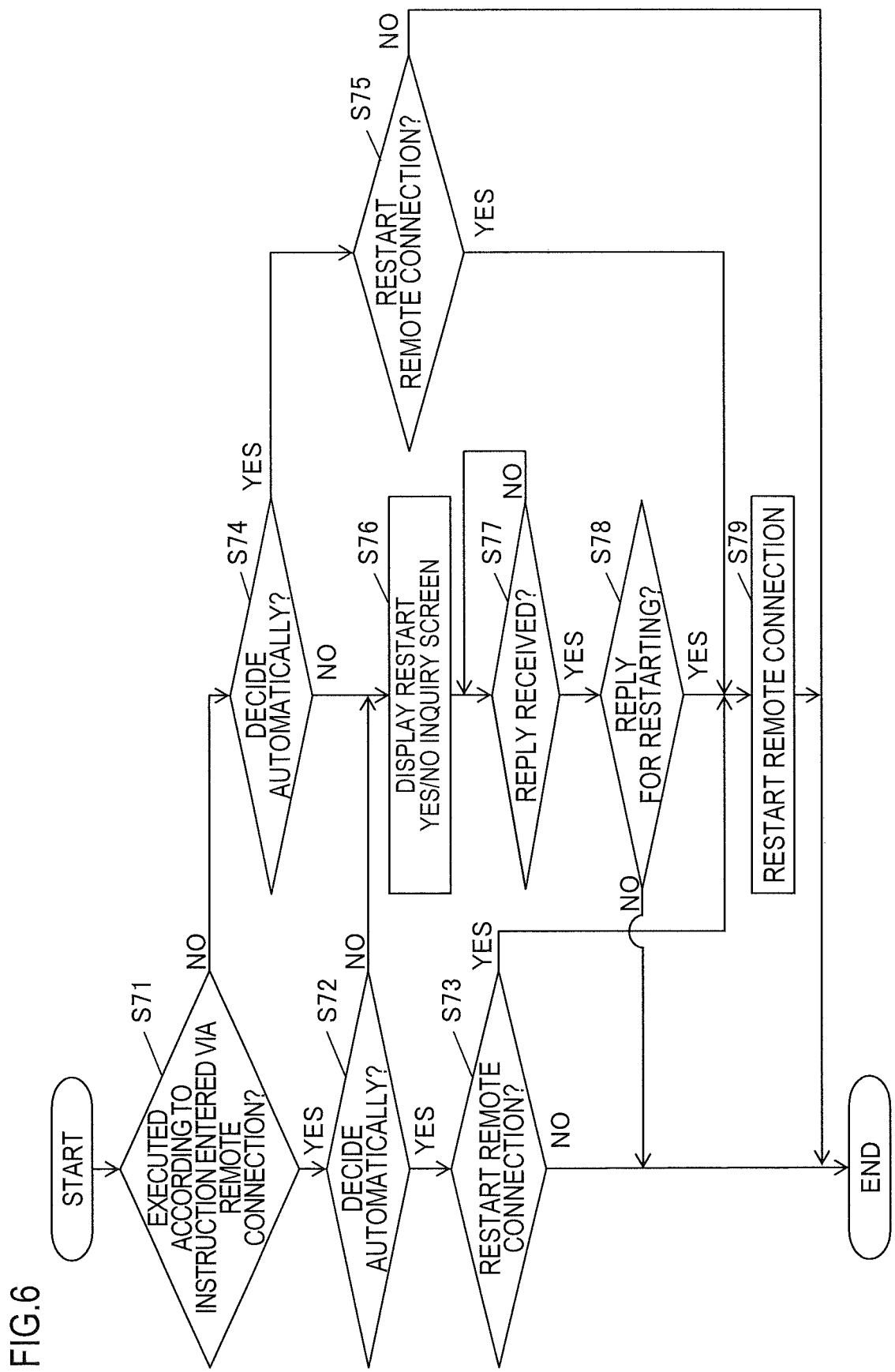
FIG. 6 is a flow chart of the operation of the image forming apparatus shown in FIG. 2 immediately after remote connection with a computer is terminated.

Next, a description will be given of the operation of the image forming apparatus 20 immediately after remote connection with the computer 30 is terminated as a result of execution of a function that terminates remote connection. FIG. 6 is a flow chart of the operation of the image forming apparatus 20 immediately after remote connection with the computer 30 is terminated as a result of execution of a function that terminates remote connection.

At Step S71, the connection controller 28b checks whether or not the most recent function of which execution is recognized to be requested at Step S51 has been executed according to an instruction entered via remote connection. If it has been executed according to an instruction entered not via remote connection, an advance is made the Step S74; if it has been executed according to an instruction entered via remote connection, an advance is made the Step S72.

At Step S72, the connection controller 28b determines whether or not to automatically decide whether or not to restart remote connection based on the automatic decision yes/no setting in the first restart setting information 27d. If the setting is for not automatically deciding whether or not to restart remote connection, an advance is made to Step S76; if the setting is for automatically deciding whether or not to restart remote connection, an advance is made to Step S73.

At Step S73, the connection controller 28b determines whether or not to restart remote connection based on the restart yes/no setting in the first restart setting information 27d. If the setting is for restarting remote connection, an advance is made to Step S79; if the setting is for not restarting remote connection, the operation shown in FIG. 6 ends without restarting remote connection.

At Step S74, the connection controller 28b determines whether or not to automatically decide whether or not to restart remote connection based on the automatic decision yes/no setting in the second restart setting information 27e. If the setting is for not automatically deciding whether or not to restart remote connection, an advance is made to Step S76; if the setting is for automatically deciding whether or not to restart remote connection, an advance is made to Step S75.

At Step S75, the connection controller 28b determines whether or not to restart remote connection based on the restart yes/no setting in the second restart setting information 27e. If the setting is for restarting remote connection, an advance is made to Step S79; if the setting is for not restarting remote connection, the operation shown in FIG. 6 ends without restarting remote connection.

At Step S76, the connection controller 28b displays on the display portion 22 a restart yes/no inquiry screen to ask the user whether or not to restart remote connection. The restart yes/no inquiry screen is a screen on which a reply of whether or not to restart remote connection can be received via the operation portion 21.

At Step S77, the connection controller 28b stands by until it recognizes a reply to be received on the restart yes/no inquiry screen, and when it recognizes so, an advance is made to Step S78.

At Step S78, the connection controller 28b checks whether or not the reply on the restart yes/no inquiry screen is for restarting remote connection. If the reply is for restarting remote connection, an advance is made to Step S79; if the reply is for not restarting remote connection, the operation shown in FIG. 6 ends without restarting remote connection.

At Step S79, remote connection with the computer 30 is restarted, and the operation shown in FIG. 6 ends.

As described above, in the image forming apparatus 20, the restart setting information 27c in which whether or not to automatically restart remote connection is defined can be changed according to an instruction entered via the operation portion 21. This provides improved convenience when remote connection is terminated.

In the image forming apparatus 20, if the restart setting information 27c includes a setting for asking the user whether or not to restart remote connection, when remote connection is terminated, the user is asked whether or not to restart remote connection. Then, according to the reply to the asking, remote connection is either restarted (Step S79) or not restarted (No at Step S78). This provides further improved convenience when remote connection is terminated.

In the image forming apparatus 20, the first restart setting information 27d for a case where an instruction to execute a function that terminates remote connection is entered via remote connection and the second restart setting information 27e for a case where such an instruction is entered not via remote connection are managed separately. Thus, whether or not to restart remote connection can be decided differently according to whether the instruction is entered via remote connection or not via remote connection (Steps S71 to S79). This provides further improved convenience when remote connection is terminated.

For example, if the first restart setting information 27d is set for automatically restarting remote connection, when an instruction to execute a function that terminates remote connection is entered via remote connection by the provider-side user, the image forming apparatus 20 automatically restarts remote connection. Thus, the provider-side user can confirm the result of execution of the function. It is also possible, when there is a possibility that the customer-side user, who is not the one who has entered for execution of a function that terminates remote connection, wishes remote connection to be maintained, to save the trouble of restarting remote connection, and thereby to provide improved convenience to the customer-side user.

For example, if the first restart setting information 27d is set for not automatically restarting remote connection, when an instruction to execute a function that terminates remote connection is entered via remote connection by the provider-side user, the image forming apparatus 20 does not automatically restart remote connection. It is thus possible, when the provider-side user does not wish remote connection to be maintained, to save the trouble of terminating remote connection.

For example, if the second restart setting information 27e is set for automatically restarting remote connection, when an instruction to execute a function that terminates remote connection is entered not via remote connection by the customer-side user, the image forming apparatus 20 automatically restarts remote connection. It is thus possible to save the trouble of restarting remote connection while allowing the customer-side user to continue receiving remote guidance or the like. It is also possible, when there is a possibility that the provider-side user, who is not the one who has entered for execution of a function that terminates remote connection, wishes remote connection to be maintained, to provide improved convenience to the provider-side user.

For example, if the second restart setting information 27e is set for not automatically restarting remote connection, when an instruction to execute a function that terminates remote connection is entered not via remote connection but via the operation portion 21 by the customer-side user, the image forming apparatus 20 does not automatically restart remote connection. It is thus possible, when the customer-side user does not wish remote connection to continue, to save the trouble of terminating remote connection.

The image forming apparatus 20 is configured to change the restart setting information 27c according to an instruction entered not via remote connection but not to change the restart setting information 27c according to an instruction entered via remote connection. It is thus possible to achieve improved security on the image forming apparatus 20. The image forming apparatus 20 may be configured to change the restart setting information 27c according to an instruction entered via remote connection.

Figure 7:
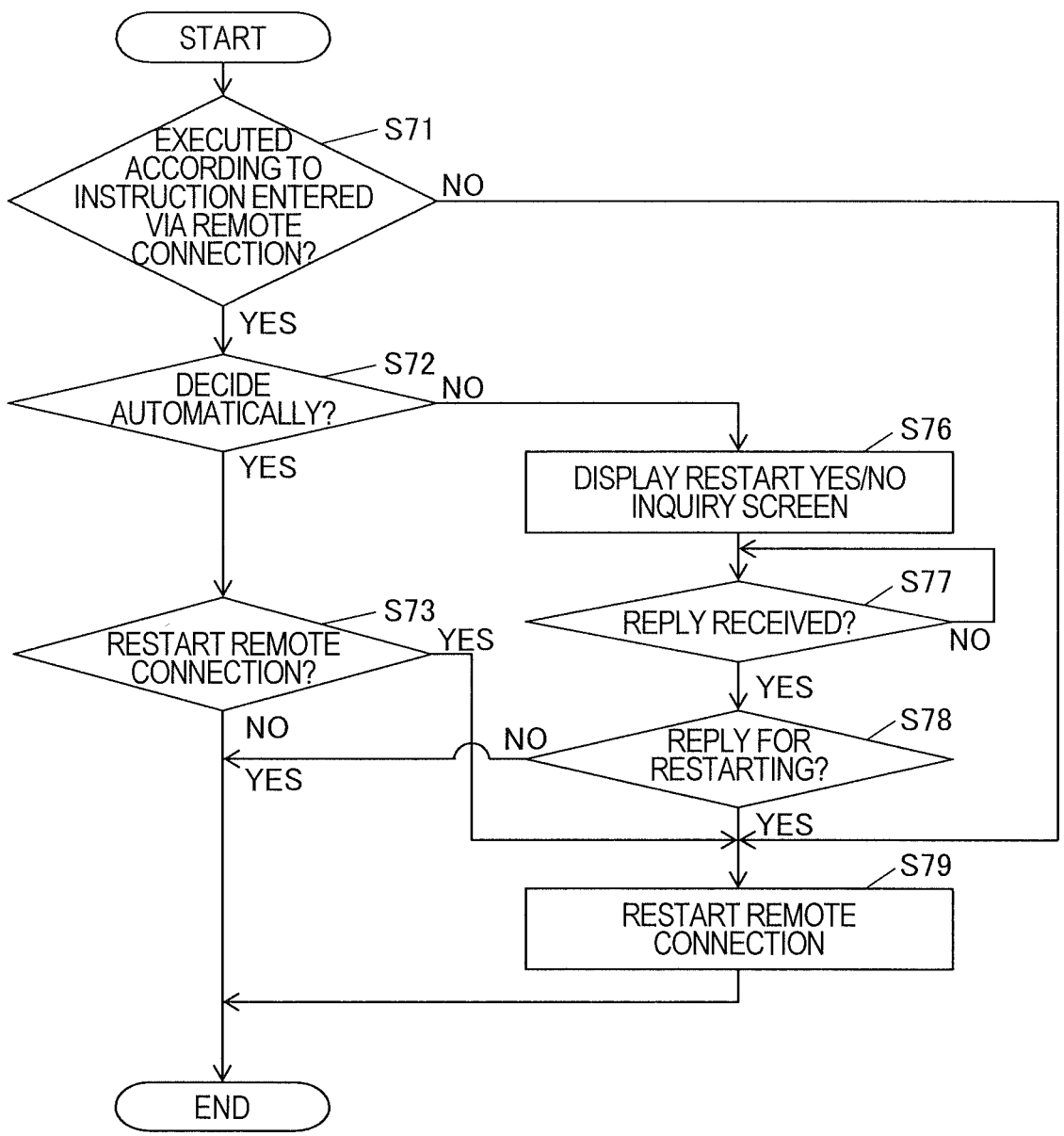
FIG. 7 is a flow chart of the operation of the image forming apparatus shown in FIG. 2 immediately after remote connection with a computer is terminated, showing an example different from the one in FIG. 6.

The image forming apparatus 20 may perform, instead of the operation shown in FIG. 6, the operation shown in FIG. 7. In FIG. 7, Steps S74 and S75 in FIG. 6 are omitted, and a No at Step S71 leads to Step S79. That is, when an instruction to execute a function that terminates remote connection is entered not via remote connection, the connection controller 28b always restarts remote connection with the computer 30.

While, in the embodiment, the electronic device that is remotely connected to an external device is configured as an image forming apparatus, it may instead be any other electronic device, such as a PC, other than an image forming apparatus.

What is claimed is:

1. An electronic device comprising:
an information manager which manages restart setting information that defines settings related to restarting of remote connection with an external device;
a connection controller which controls the remote connection; and
a function executor which executes a function while the remote connection is maintained,
wherein
the information manager changes the restart setting information according to an instruction,
the restart setting information includes:
first restart setting information For a case where an instruction to execute a function that terminates the remote connection is entered via the remote connection; and
second restart setting information for a case where the instruction to execute the function that terminates the remote connection is entered not via the remote connection,
when the remote connection is terminated as a result of the function that terminates the remote connection being executed by the function executor based on the instruction entered via the remote connection, the connection controller,
if the first restart setting information includes a setting for automatically restarting the remote connection, automatically restarts the remote connection and,
if the first restart setting information includes a setting for not automatically restarting the remote connection, does not automatically restart the remote connection, and
when the remote connection is terminated as a result of the function that terminates the remote connection being executed by the function executor based on the instruction entered not via the remote connection, the connection controller,
if the second restart setting information includes a setting for automatically restarting the remote connection, automatically restarts the remote connection and,
if the second restart setting information includes a setting for not automatically restarting the remote connection, does not automatically restart the remote connection,
wherein
when the remote connection is terminated as a result of the function that terminates the remote connection being executed by the function executor based on the instruction entered via the remote connection, if the first restart setting information includes a setting for asking a user whether or not to restart the remote connection, or
when the remote connection is terminated as a result of the function that terminates the remote connection being executed by the function executor based on the instruction entered not via the remote connection, if the second restart setting information includes the setting for asking a user whether or not to restart the remote connection,
the connection controller asks the user whether or not to restart the remote connection so that,
if a reply is for restarting the remote connection, the connection controller restarts the remote connection and,
if the reply is for not restarting the remote connection, the connection controller does not restart the remote connection.

2. The electronic device according to claim 1, wherein the information manager separately manages
the first restart setting information and
the second restart setting information.

3. The electronic device according to claim 1, wherein the information manager
changes the restart setting information according to an instruction entered not via the remote connection and
does no change to the restart setting information according to an instruction entered via the remote connection.

4. A non-transitory computer-readable recording medium which stores a remote connection control program that is executable on a computer in an electronic device,
wherein,
when executed, the remote connection control program makes the computer operate as:
an information manager which manages restart setting information that defines settings related to restarting of remote connection with an external device;
a connection controller which controls the remote connection; and
a function executor which executes a function while the remote connection is maintained,
the information manager changes the restart setting information according to an instruction,
the restart setting information includes:
first restart setting information fora case where an instruction to execute a function that terminates the remote connection is entered via the remote connection; and
second restart setting information for a case where the instruction to execute the function that terminates the remote connection is entered not via the remote connection,
when the remote connection is terminated as a result of the function that terminates the remote connection being executed by the function executor based on the instruction entered via the remote connection, the connection controller,
if the first restart setting information includes a setting for automatically restarting the remote connection, automatically restarts the remote connection and,
if the first restart setting information includes a setting for not automatically restarting the remote connection, does not automatically restart the remote connection, and
when the remote connection is terminated as a result of the function that terminates the remote connection being executed by the function executor based on the instruction entered not via the remote connection, the connection controller,
if the second restart setting information includes a setting for automatically restarting the remote connection, automatically restarts the remote connection and,
if the second restart setting information includes a setting for not automatically restarting the remote connection, does not automatically restart the remote connection,
wherein
when the remote connection is terminated as a result of the function that terminates the remote connection being executed by the function executor based on the instruction entered via the remote connection, if the first restart setting information includes a setting for asking a user whether or not to restart the remote connection, or
when the remote connection is terminated as a result of the function that terminates the remote connection being executed by the function executor based on the instruction entered not via the remote connection if the second restart setting information includes the setting for asking a user whether or not to restart the remote connection, the connection controller asks the user whether or not to restart the remote connection so that, if a reply is for restarting the remote connection, the connection controller restarts the remote connection and, if the reply is for not restarting the remote connection, the connection controller does not restart the remote connection.

\* \* \* \* \*